Patented Apr. 27, 1937

2,078,736

UNITED STATES PATENT OFFICE 2,078,736

MOTOR FUEL

Hendrik B. J. Schurink, The Hague, Netherlands, assignor to Shell Development Company, San Francisco, Calif., a corporation of Delaware No Drawing. Application November 26, 1935, Serial No. 51,632. In the Netherlands December 13, 1934

6 Claims. (Cl. 44—9)

This invention relates to a composition of matter suitable for motor fuel, and specifically relates to stable mixtures of tertiary butyl alcohol, hydrocarbons and water.

It has been known for some time that alcohols have a high anti-knock value when used for fuel in gasoline engines. Substitutes for gasolines consisting of various alcohols alone or blended with hydrocarbons are being used widely. The lower alcohols, namely, methyl, ethyl, and propyl alcohols have the disadvantage of becoming non-miscible with hydrocarbons in the presence of even small quantities of water. Higher alcohols, while more readily miscible with hydrocarbons and not susceptible to separation by small quantities of water, have heretofore been considered less satisfactory for fuel purposes, because their anti-knock value is somewhat lower than that of corresponding lower alcohols.

I have discovered that tertiary butyl alcohol besides having a relatively low susceptibility to separation by water from mixtures with hydrocarbons, has a very high anti-knock value when mixed with moderate quantities of water. For instance, a mixture of 70% by weight of a tertiary butyl alcohol and 30% water has an A. S. T. M. octane number considerably in excess of 100.

While water lowers the calorific value of a motor fuel, this loss is partially compensated by an increase in the volumetric efficiency of engines operating with hydrated mixtures. Water having a very high latent heat of vaporization tends to cool the fuel-air mixture entering the cylinders, with the result of contracting the vaporous mixture and allowing a greater weight thereof to enter the cylinders per engine stroke. Aqueous solutions of tertiary butyl alcohol with a water content as high as 35% by weight have been used successfully to run gasoline engines with a fair power output, mixtures containing between 12 and 30% water giving excellent engine performances. Such fuels are particularly suited for air-cooled engines.

In addition to improving the octane number, water lowers the melting point of tertiary butyl alcohol which normally being 25° C., would cause considerable difficulties in cool weather, due to solidification of the alcohol. The following relation between melting point and water content of tertiary butyl alcohol was found:

| Percent by weight of water in tertiary butyl alcohol | Melting point °C. |
|---|---|
| 0 | 25 |
| 5 | 7 |
| 9 | 0 |
| 12 | −5 |
| 15 | −8 |
| 20 | −12 |

According to the above figures all-weather motor fuels that may be used at freezing temperatures and below, containing substantial amounts of tertiary butyl alcohol, should also contain not less than 9% and preferably not less than 12% by weight of water calculated on the amount of alcohols. In other words, the aqueous alcohol in the fuel should preferably be not stronger than the tertiary butyl alcohol-water azeotrope, which contains about 12% water.

The calorific value of tertiary butyl alcohol-water mixtures can be increased by adding to the mixtures such hydrocarbons of gasoline type, as gasoline, distillates of petroleum, benzene, polymers of alkenes, such as di-isobutylene, or hydrogenated polymers, like iso-octane, etc. Tertiary butyl alcohol containing about 2% or less water is miscible at ordinary temperatures with benzol or gasoline in all proportions. Higher contents of water cause the miscibility with hydrocarbons to decrease, so that the higher the water content of the alcohol is, the less hydrocarbons can be admixed without causing the separation of a water layer. To illustrate this point, the approximate miscibility limits of di-isobutylene with tertiary butyl alcohol containing different amounts of water are given below for the temperature of 25° C.:

| Percent by weight of water in tertiary butyl alcohol | Miscibility limit max. percent by weight of di-isobutylene in aqueous tert. butyl alcohol di-isobutylene solution |
|---|---|
| 0 | 100 |
| 10 | 55 |
| 12 | 50 |
| 20 | 29 |
| 30 | 16 |
| 40 | 9 |

I have found it preferable, from the viewpoint of engine performance, to use fuel mixtures provided by combining an aqueous tertiary butyl alcohol of concentrations from about 88% to about 65% by weight and a gasoline type hydrocarbon mixture, preferably benzol and/or di-isobutylene, in quantities not to exceed the miscibility limit at operating temperatures.

The described motor fuel may be used in conjunction with anti-knock compounds, anticorrosives, gum inhibitors, dyes, etc.

I claim as my invention:

1. An antiknock motor fuel comprising an aqueous tertiary butyl alcohol containing from about 12% to 35% by weight of water.

2. An antiknock motor fuel comprising an aqueous tertiary butyl alcohol containing from about 12% to 35% by weight of water and a gasoline type hydrocarbon product in a quantity not to exceed the miscibility limit of the fuel components.

3. An antiknock motor fuel comprising an aqueous tertiary butyl alcohol containing from about 12% to 35% by weight of water and benzol in a quantity not to exceed the miscibility limit of the fuel components.

4. An antiknock motor fuel comprising an aqueous tertiary butyl alcohol containing from about 12% to 35% by weight of water and diisobutylene in a quantity not to exceed the miscibility limit of the fuel components.

5. In a process of running a gasoline engine the step of subjecting a combustible mixture comprising an aqueous tertiary butyl alcohol containing from about 12 to 35% by weight of water to combustion in said engine as antiknock fuel.

6. In a process of running a gasoline engine the step of subjecting a combustible mixture comprising an aqueous tertiary butyl alcohol containing from about 12 to 35% by weight of water and a gasoline-type hydrocarbon product to combustion in said engine as antiknock fuel.

HENDRIK B. J. SCHURINK.